United States Patent Office 3,519,395
Patented July 7, 1970

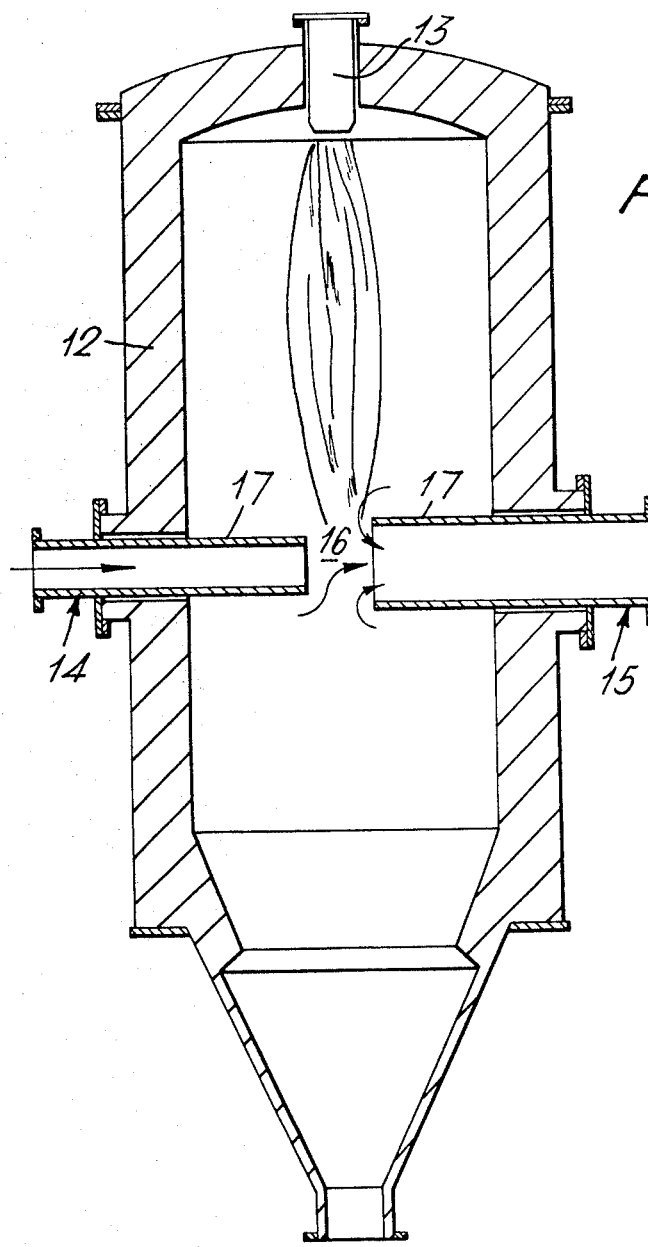

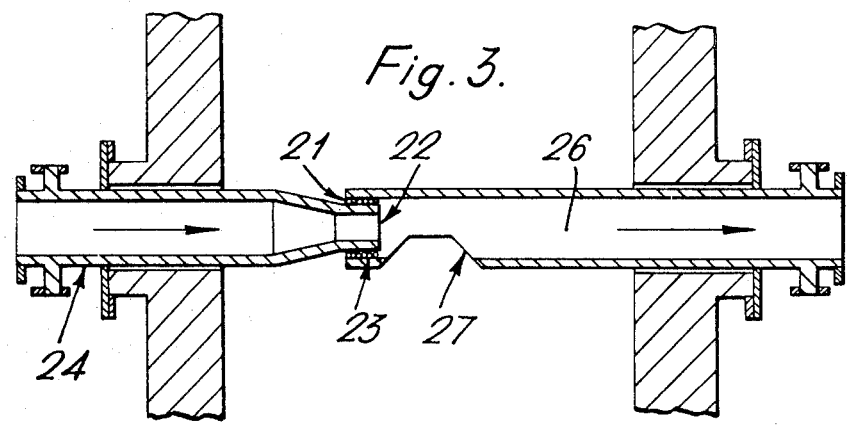
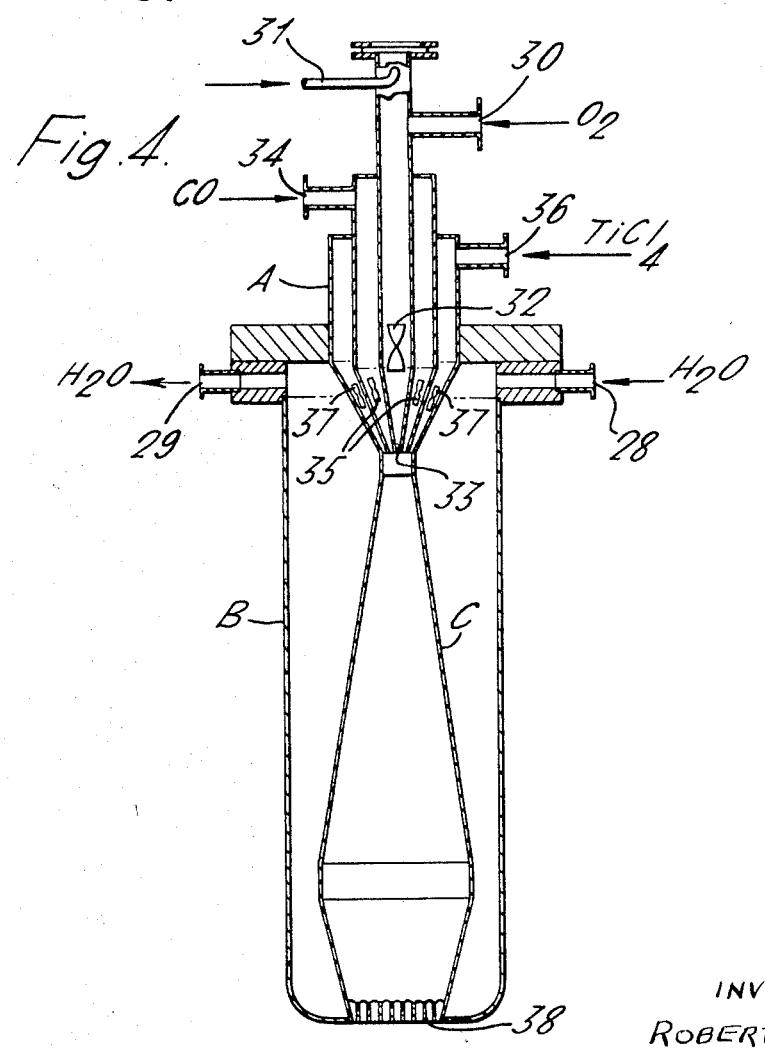

3,519,395
APPARATUS FOR THE PRODUCTION
OF METAL OXIDES
Robert Jean Mas, Thann, Haut-Rhin, and André Louis
Michaud, Vieux-Thann, Haut-Rhin, France, assignors
to Fabriques de Produits Chimiques de Thann et de
Muthouse, Thann, Haut-Rhin, France, a French body
corporate
Filed June 20, 1966, Ser. No. 558,722
Claims priority, application Great Britain, June 22, 1965,
26,421/65
The portion of the term of the patent subsequent to
Dec. 12, 1984, has been disclaimed
Int. Cl. C01g 23/04
U.S. Cl. 23—277
8 Claims

ABSTRACT OF THE DISCLOSURE

A vertical cylindrical furnace for the production of finely divided metal oxide such as $TiO_2$ from a volatile metal halide, such as vaporized $TiCl_4$, has at the top a burner device comprising concentric conduits fed separately with oxygen, an inflammable gas and metal halide vapor, which conduits open downwardly through a common orifice into a tapered mixing chamber that delivers an axial, downwardly extending flame from a nozzle at its lower end; and oxide-containing gases formed in the flame are discharged by a radial exit tube that passes through the furnace wall at a distance below the burner nozzle and has an offtake opening at or near the longitudinal axis of the furnace. Another radial tube can lead through a venturi into the exit tube for feeding thereinto a cool gas stream that will draw reaction products into and cool them quickly in the exit tube.

---

Figure 1:
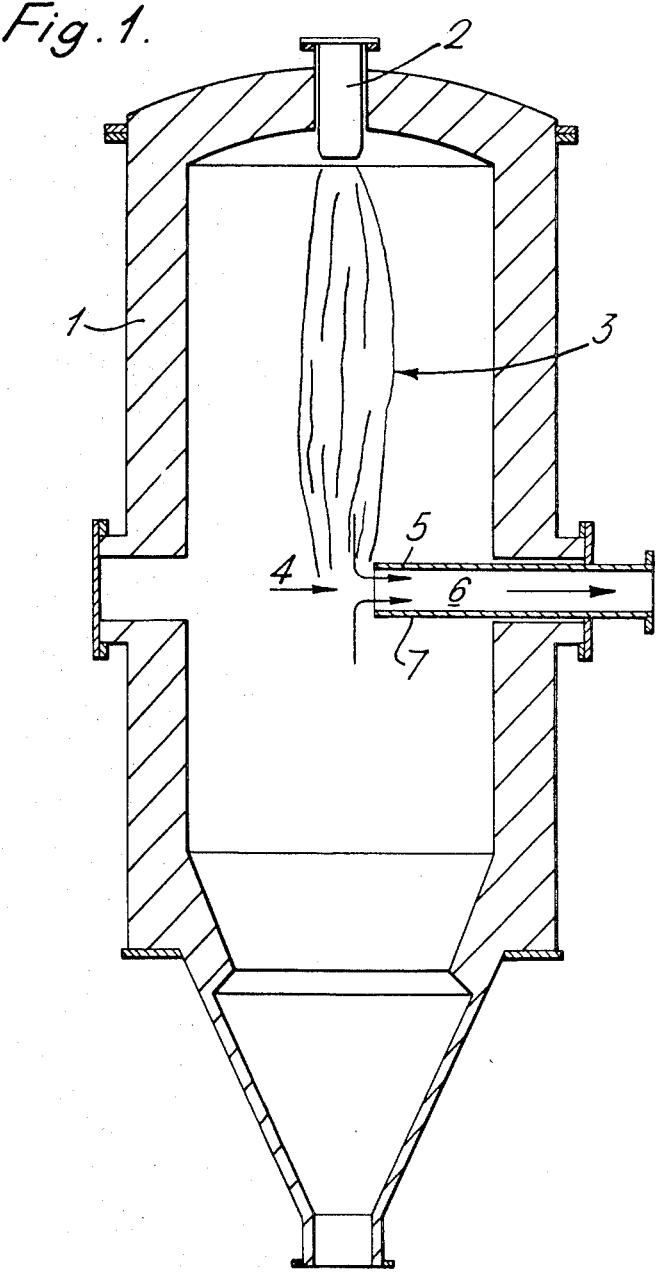

This invention relates to apparatus useful, inter alia, for the production of finely-divided metal oxides by the high temperature, vapor phase oxidation of metal chlorides. The invention is primarily concerned with apparatus for the production of titanium dioxide from titanium tetrachloride, but the apparatus of the invention may also be used for the oxidation of other volatile metal chlorides into the oxides of the corresponding metals. Examples of chlorides which can be used include those of zirconium, aluminium, tin, chromium, iron and silicon (which for the purpose of this invention is considered to be a metal).

Metal chlorides in the vapor phase may be burnt in oxygen at high temperatures, e.g. above 1000° C., to give a suspension of metal oxide particles in a chlorine-containing gas. The finely-divided oxide particles thus produced make the oxide very suitable for many commercial applications, e.g. as a pigment.

Many modifications of this general type of process are known. For example, the chloride vapor may be mixed, prior to combustion, with an inert diluent gas or with various substances said to improve the quality of the oxide produced. Various burner arrangements have been used to ensure adequate mixing of the metal chloride vapor and oxygen, and the period the oxide remains in the combustion zone has been closely controlled.

Three main categories of process may be specifically referred to: processes involving an auxiliary flame, i.e. a flame of a combustible gas, usually carbon monoxide, into which the metal chloride and oxygen are introduced to induce combustion; processes in which no auxiliary flame is used; and processes in which the combustion of the metal chloride takes place in a fluidized bed of the oxide produced by the combustion. These types of process have certain disadvantages.

Thus, in processes in which an auxiliary flame is not used, it is necessary to preheat the gaseous reactants, and this makes necessary large and complicated installations outside the reaction furnace.

Processes involving the use of a fluidized bed have the same disadvantages and it is also necessary to keep the fluidized bed at a high constant temperature.

In the processes in which an auxiliary flame is used, there is no problem of heating the reactants, but the difficulty of maintaining a homogeneous and stable flame still exists. In known processes, this difficulty has not, so far, been completely overcome.

Thus, in one such process titanium tetrachloride, oxygen and nitrogen are introduced through a number of inlets arranged in a circle into the interior of the auxiliary carbon monoxide flame which heats the reactants to combustion temperature. The carbon monoxide flame is formed of a relatively large number of individual flames which burn round the inlets through which the reactants are introduced. This arrangement gives a complex flame structure which is difficult to control closely, and the lack of control results in a non-uniform metal oxide product.

In another process a stream of hot burnt gases from an auxiliary flame is introduced into a cylindrical combustion chamber in a direction tangential to the walls of the said chamber and a mixture of metal chloride and oxygen is injected into the spiralling stream of hot, burnt gases in a direction parallel with the axis of the combustion chamber. In this process the flame produced by the combustion of the metal chloride (hereinafter referred to as the "chloride flame") is separated from the auxiliary flame and control of the chloride combustion is, to some extent, facilitated, but the mixture of metal chloride and oxygen is not sufficiently rapidly mixed with hot, burnt gases for adequate control of the chloride flame to be possible, and the walls of the combustion chamber are corroded by the spiralling gases.

The present invention provides an improved burner device for use in the production of finely-divided metal oxides by the combustion of their vaporous halides, and includes within its scope the combinations of such burners with the improved type of furnace described and claimed in our British patent specification No. 1,019,365. The burners of the present invention are of the premixing type and comprise a mixing chamber having at one end a burner nozzle and tapering towards the other end to form a narrow inlet orifice, and conduits connected to said inlet orifice, whereby the orifice can be fed separately with oxygen, an inflammable gas and a metal halide vapor.

In its preferred form the burner has a tubular mixing chamber tapering both towards the inlet orifice and the burner nozzle, and the various gases are fed to the inlet orifice through concentric tubes which taper towards the inlet orifice. Thus the concentric feed tubes and the mixing chamber form a venturi tube.

The burner can readily be fitted to any part of a conventional furnace, but is preferably fitted to the upper part, thereby directing the flame towards the reaction zone in the centre of the furnace. The burner should, of course, be made of a heat and corrosion resisting material, and it is therefore preferred that the mixing chamber, or the conduits or both, are of aluminium or an aluminium alloy. The cooling of the mixing chamber is conveniently provided by a water jacket.

This type of burner is easy to control and gives a regular and stable flame, which may be readily adjusted by altering the rates of flow of the gases into the burner. Both the size and temperature of the flame may be adjusted in this way, and thus the burner may be used to produce both the anatase and the rutile form of titania by suitable alterations of the flame temperature.

The burners of this invention are particularly suitable for the production of titanium dioxide, in a form suitable for use, inter alia, as a pigment, by the combustion of titanium tetrachloride. When employed for this purpose the burner is combined with a furnace, and is advantageously used in conjunction with the process described and claimed in our British patent specification No. 1,019,364 by combining the burner with the type of furnace adapted for this process and described and claimed in our British patent specification No. 1,019,365. Thus the present invention provides also a furnace containing one or more of the premixing burners described above, means for discharging oxygen-containing gases from the furnace, and means for cooling and separating the said oxide.

Normally, the furnace is generally cylindrical in shape, with its longitudinal axis substantially vertical, and the burners are positioned so as to provide an axial downwardly extending flame, and the means for discharging oxygen-containing gases comprises one or more exit tubes which are radially located and have their openings at or near the said axis. Usually it will be found convenient for the exit tube or tubes to be located at least halfway along the longitudinal axis of the furnace, measured from the burner nozzle.

In a preferred modification of the furnace, there is provided also at least one cooled feed tube for the introduction of cold gas openings into the furnace near the openings of the exit tube or tubes; this results in a smooth, regular combustion and the absence of adhering incrustations on the tubing and the walls of the furnace. For convenience it is preferred to recycle through the feed tubes the combustion gases after removal of the titanium dioxide and cooling.

It will be appreciated that more than one feed tube may be used in conjunction with a single exit tube, or vice versa, but for simplicity the apparatus will be described herein with reference to a single exit tube and a single feed tube.

The hot gases produced by the reaction and the cool gases, after meeting within the furnace, are desirably removed together through the exit tubes by suction. Thus there may be between the ends of the cool gas inlet and product outlet tubes an interspace allowing removal of the burned gases without interrupting the uniform flow of the gases within the tubing, or the inlet and outlet tubes may be connected and apertures provided, preferably in the exit (outlet) tube, for the removal of the burned gases from the furnace.

In the simplest case, i.e. in an equipment for the oxidation of titanium tetrachloride in a furnace without provision for the feeding of cooled gases, the removal of the hot gases is effected by a degree of vacuum maintained, for instance, by an exhauster, through one or more exit tubes which collect the gases at or near the longitudinal axis of the furnace, far away from its hot walls.

Such a simple device has numerous advantages. The hot reaction gases never come into contact with the walls of the furnace, the flame of the burners is not disturbed by turbulence, the oxidation takes place smoothly, and the formation of incrustations causing plugging of the burner nozzle, and/or feed tubes and exit tubes is prevented. Furthermore, it is readily possible to cool the tubes by circulation of cold water, the tubes being made of a metal resistant to corrosion, such as aluminium or its alloys.

A modification of this type of furnace, which provides for the feeding of cold gases, consists in a furnace in which are located one or more tubes for feeding gases into and for removing gases from the combustion chamber, fitted with means for cooling the gases in the tubes, and arranged so that the hot burned gases come into contact with the cold gases inside the combustion chamber, near to its longitudinal axis, and are evacuated mixed with them.

In a preferred form of this modification, the cool gases enter and leave the furnace through water-jacketed tubes, placed horizontally through the vertical chamber and arranged with apertures for the contact and the mixing of the gases within the reaction chamber.

Preferably the tubes are designed as venturi, in which case the narrow end of the cool gas feed tube forms an annular space with the broader end of the exit tube into which it penetrates, causing the hot reaction gases to be sucked into the exit tube.

When the premixing burner is used with this type of furnace, the hot gases are evacuated through one or more tubes collecting them at or near the longitudinal axis of the reaction chamber, far from the walls. These tubes are cooled, preferably by a current of water circulating through a jacket, and are made of a corrosion resisting metal such as aluminium or one of its alloys, e.g. a binary alloy containing 3% by weight of magnesium. On these cooled metallic surfaces no adherent crusts are formed, and any deposits are easily removed by a light scraping; coarse material, if present at all, is easily collected and recovered at the bottom of the furnace, which is desirably frusto-conical in shape.

The combination of the burners with the extractor furnace results in a better control of the size of the particles of the titanium dioxide obtained, and in avoiding deposits on the walls and plugging of the burner nozzle and/or the feed tubes and exit tubes. The titanium dioxide is of very good texture.

It has been found that with this type of furnace it is possible to mix the gases produced by the combustion in the furnace with the appropriate amount of cold recycled gases, and so to remove the suspension of titanium dioxide in the hot burned gases, without disturbing in any way the conditions prevailing during the oxidation reaction and in the flame and without plugging the burner nozzle and/or tubes and exit tubes by titanium dioxide deposits.

These exit openings may be annular or of some other design, the feed and exit pipes being arranged in line, but entirely separate, or alternatively formed in effect of a single tube provided with one or several apertures of any suitable shape, for instance at several places, but preferably in the side opposite to that facing the flame, in order to avoid overheating.

The invention is illustrated in the accompanying drawings, in which:

FIG. 1 is a vertical schematic cross-section of a combined burner and furnace having no provision for the recirculation of cold gases, FIG. 2 is a vertical schematic cross-section of a combined burner and furnace having provision for the recirculation of cold gases, FIG. 3 is a cross-section of part of another apparatus having provision for the recirculation of cold gases, and FIG. 4 is a vertical cross-section of a burner of the present invention, as used in the forms of apparatus shown in FIGS. 1 and 2.

Referring now to the drawings, the apparatus illustrated in FIG. 1 comprises a vertical oxidation furnace 1, at the top of which a premixing burner 2 produces a flame 3 burning in a reaction zone 4 in the axis of the furnace. The flame comes close to the inner end of an exit tube 5 through which the hot gases produced 6 are sucked by an exhauster (not shown). These gases are cooled in the exit tube 5 by water flowing through a jacket (not shown) surrounding tube 5 and indicated by numeral 7.

The apparatus illustrated in FIG. 2 is generally similar, except that it is adapted for use when cold gases are recycled from the furnace.

Cold recycled gases are introduced through a feed tube 14 situated somewhat more than half way down an oxidation furnace 12 equipped with a premixing burner 13. The feed tube 14 opens into the reaction zone close to and opposite an exit tube 15, the tips of these tubes being separated by a free space 16, and the tubes being thoroughly cooled by circulating cold water through jacket 17 (not shown).

The free space 16 provided between the ends of the tubes is of a size sufficient to allow the hot gases produced by the reaction to be swept off through the exit tube 15 by the flow of the cold gases, namely about half the diameter of the tube.

The hot gases produced retain in suspension the solid titanium dioxide produced by the reaction as more or less fine particles. It has been noticed that the finer particles are preferentially carried away through the exit tube, whilst the coarser particles fall into the lower part of the furnace, where they accumulate and may be removed automatically, continuously or not, and recovered.

The arrangement of feed tubes and exit tubes illustrated in FIG. 3 is particularly advantageous. In it the free space 16 of FIG. 2 is reduced to an annular space 21 formed between the end 22 of feed tube 24 and the end 23 of exit tube 26, the feed tube penetrating into the exit tube; in this arrangement the space 21 does not serve for the passage of the gases, but to allow play for the thermal expansion of the metallic parts of the device.

The narrow end 22 of the feed tube 24 serves to raise the pressure of the cold gases in the tube. The hot gases are drawn into the exit tube 26 through an aperture 27 large enough not to hinder their flow, and then meet the cold gases immediately after they have entered the exit tube. The aperture 27 may be of various shapes, such as round, oval, or truncated conical. The device is desirably designed as a venturi, as illustrated.

FIG. 4 represents a premixing burner of the present invention, and is represented diagrammatically at 2 and 13 in FIGS. 1 and 2 respectively. In this figure, A indicates a burner head with concentric tubes, B a jacket cooled by circulation of cold water entering at inlet 28 and leaving by outlet 29, and C a mixing chamber.

Oxygen is introduced into the burner head A by way of inlet 30, may be optionally mixed with nitrogen or another inert gas entering via inlet 31, and passes to inlet orifice 33, the flow rate being controlled by the position of movable fins 32. Carbon monoxide or another inflammable gas is fed through inlet 34 and titanium tetrachloride (together with oxygen if desired) through inlet 36 to the inlet orifice 33, being controlled by the position of movable fins 35 and 37 respectively.

The various gases pass through the narrow inlet orifice 33 into the mixing chamber C, where they become thoroughly mixed before reaching the burner nozzle 38, where they are ignited. Since both the concentric inlet tubes and the mixing chamber taper towards the inlet orifice, a narrow neck is formed between the concentric tubes and the mixing chamber, producing a venturi effect which gives greater turbulence at the inlet orifice, leading to more efficient mixing within the mixing chamber.

This type of burner enables a regular and steady flame to be maintained, which yields a product having a suitably uniform particle size. The steadiness of the flame is enhanced by the use of the extractor type of furnace, a combination which has the added advantage of reducing the losses and difficulties caused by the formation of titania incrustations within the reaction chamber.

We claim:

1. Apparatus for use in the production of finely divided metal oxides comprising a furnace including at least one burner device, means for discharging oxide-containing gases from the furnace and means for cooling and separating the oxides, in which the furnace is generally cylindrical in shape with its longitudinal axis substantially vertical and the burner device is positioned so as to provide an axial, downwardly extending flame, the burner device comprising a mixing chamber having at one end a burner nozzle and tapering towards the other end to form an inlet orifice, and concentric conduits opening downwardly to the inlet orifice, whereby the orifice can be fed separately with oxygen, an inflammable gas and a metal halide vapor, and in which the means for discharging oxide-containing gases comprises at least one exit tube which passes through the furnace wall below the burner nozzle, which is substantially radially located with respect to the longitudinal axis of the furnace and which has its opening at or near said axis.

2. Apparatus according to claim 1 wherein the opening of the tube is situated at least halfway along the longitudinal axis of the furnace, measured from the burner nozzle.

3. Apparatus according to claim 1 comprising also at least one cooled feed tube for the introduction of cold gas into the furnace, said feed tube opening into the furnace near the opening of the exit tube.

4. Apparatus according to claim 1 wherein the exit tubes are provided with cooling jackets.

5. Apparatus according to claim 1 comprising also at least one feed tube for the introduction of cold gas into the open end of the exit tube.

6. Apparatus according to claim 5, wherein the exit tubes and the feed tubes are provided with cooling jackets.

7. Apparatus according to claim 5 wherein each feed tube forms, with an exit tube, a venturi adapted to cause the cold gases to exert a withdrawing force on the hot gases.

8. Apparatus according to claim 7 wherein the exit tube contains lateral apertures in the sides away from the flame.

References Cited

UNITED STATES PATENTS

| | | | |
|---|---|---|---|
| 3,357,794 | 12/1967 | Mas et al. | 23—202 |
| 3,403,001 | 9/1968 | Mas et al. | 23—202 |
| 1,020,612 | 3/1912 | Lawton | 239—400 |
| 3,297,411 | 1/1967 | Dear | 23—284 |
| 3,361,525 | 1/1968 | De Rycke et al. | 23—140 |

FOREIGN PATENTS

| | | |
|---|---|---|
| 172,755 | 12/1921 | Great Britain. |

JAMES H. TAYMAN, JR., Primary Examiner

U.S. Cl. X.R.

23—139, 140, 202, 284; 239—400, 428; 431—181, 187